(12) United States Patent
Fresch et al.

(10) Patent No.: US 7,279,026 B1
(45) Date of Patent: Oct. 9, 2007

(54) HEAT OF COMPRESSION PULSE PURGE GAS DRYER

(75) Inventors: Vincent P. Fresch, Elm Grove, WI (US); Titus A. Mathews, Pleasant Prairie, WI (US)

(73) Assignee: Pneumatech LLC, Kenosha, WI (US)

( * ) Notice: Subject to any disclaimer, the term of this patent is extended or adjusted under 35 U.S.C. 154(b) by 434 days.

(21) Appl. No.: 11/102,376

(22) Filed: Apr. 8, 2005

(51) Int. Cl.
*B01D 53/04* (2006.01)
*B01D 53/26* (2006.01)

(52) U.S. Cl. .......................................... 95/124; 96/126
(58) Field of Classification Search ................ 95/117, 95/121, 122, 123, 124, 148; 96/121, 126; 55/DIG. 17; 34/330
See application file for complete search history.

(56) References Cited

U.S. PATENT DOCUMENTS

| | | | | |
|---|---|---|---|---|
| 3,950,154 A | * | 4/1976 | Henderson et al. | ........... 96/126 |
| 4,919,695 A | * | 4/1990 | Trepaud | ...................... 96/126 |
| 5,037,458 A | * | 8/1991 | Trepaud | ...................... 96/109 |
| 5,681,370 A | * | 10/1997 | McMahon | .................... 95/105 |
| 5,925,169 A | * | 7/1999 | Vertriest | ........................ 95/99 |
| 6,171,377 B1 | | 1/2001 | Henderson | |
| 6,375,722 B1 | | 4/2002 | Henderson et al. | |
| 6,767,390 B2 | | 7/2004 | Battershell et al. | |
| 7,000,332 B1 | * | 2/2006 | Fresch et al. | ................. 34/330 |

* cited by examiner

*Primary Examiner*—Frank M. Lawrence
(74) *Attorney, Agent, or Firm*—Lowenstein Sandler PC

(57) ABSTRACT

A heat of compression gas drying apparatus includes an air inlet fed by a source of compressed moisture laden air, an air outlet and first and second desiccant-containing towers for processing air flowing therethrough. A portion of cooled dried air delivered to the air outlet is selectively diverted to either a pathway having a heater so that heated dried air may be delivered to a tower having its desiccant regenerated, or to a separate pathway so that cooled dried air is delivered to the regenerating tower. In each case, a purge isolation valve is controlled to deliver and hold pressurized dried air in the regenerating tower after which the dried air in the regenerating tower is purged to atmosphere by pulsing an exhaust valve arrangement connected to the regenerating tower.

7 Claims, 1 Drawing Sheet

HEAT OF COMPRESSION PULSE PURGE GAS DRYER

FIELD OF THE INVENTION

This invention relates generally to a twin tower gas drying apparatus and, more particularly, pertains to an externally heated twin tower gas drying apparatus which uses an enhanced heat of compression pulse purge regeneration (PPR) design which is more energy efficient than previous designs.

BACKGROUND OF THE INVENTION

The presence of moisture and gases leads to difficulties in many industries and operations. With a slight drop in temperature, condensation can occur in pipelines and reservoirs which can lead to corrosion, scales, freeze-ups, dirt, etc. which may damage instruments and controls and cause blockages in airlines, produce excessive pressure drops, increase downtime and reduce the life of tools. Similarly, in chemical, food and metalworking industries, the presence of moisture in the air and gases produces undesired oxidation. It has also been found that the robotics field requires extremely dry air for the operation of its pneumatic systems.

In order to produce extremely dry air i.e., dew points of $-40°$ Fahrenheit or lower, it is often desirable to use a heat of compression dryer system. In such a system, hot moisture laden air from a compressor is fed through a regenerating tower and then passed to an aftercooler and drain system so that cooled dry air is transferred into and through a drying tower for delivery to an air outlet. In a system such as described, if the compressor is operated at less than capacity, it does not generate enough heat (approximately $250°$ Fahrenheit) to adequately facilitate regeneration of a tower.

It is desirable to provide an improved twin tower heat of compression drying system that rectifies the drawbacks of the prior system by enhancing the previous dryer design.

SUMMARY OF THE INVENTION

It is a general object of the present invention to provide a heat of compression dryer which utilizes a heater and pulse purge regeneration (PPR) characteristics to improve dryer performance.

In one aspect of the invention, a heat of compression gas drying apparatus includes a dryer inlet for receiving compressed moisture laden air, and a dryer outlet for delivering compressed dry air. The apparatus includes first and second desiccant-containing towers and an aftercooler, separator and drain system. Both towers have exhaust valve arrangements. A conduit structure is provided for interconnecting the first and second towers in the aftercooler, separation and drain system and enabling passage of the moisture laden air from the dryer inlet to be processed by the first and second towers in the aftercooler, separator and drain system for delivering cooled dry air to the dryer outlet. A control arrangement is connected to the conduit structure for controlling the flow of air through the first and second towers and the aftercooler, separator and drain system, the control arrangement including a purge isolation valve. A heater is interconnected to the first and second towers by the conduit structure and is selectively energized by the control arrangement to receive a portion of dry air from one of the towers in response to periodic actuation of the purge isolation valve so as to deliver heated dry air to the other of the towers with its exhaust valve arrangement open. The control arrangement allows de-energization of the heater and bypassing of the dry air outside the de-energized heater through the conduit structure for periodically delivering cooled dry air to the other of the towers. Closing of the exhaust valve permits building of a predetermined pressure in the conduit structure, the heater and the other of the towers and momentarily holding of the pressure in the other of the towers for a predetermined interval. When the predetermined pressure is reached, the isolation valve is closed to hold the pressure in the heater shell and the other off the tower. After the interval, the exhaust valve arrangement of the other of the towers is pulsed open to purge the moisture laden air therein to atmosphere.

A pulse purge regeneration valve may be positioned downstream of the heater in the conduit structure and may be pulsed on/off upon actuation of the purge isolation valve.

The invention further contemplates a method for drying gas in an apparatus having an air inlet fed by a source of compressed moisture laden air, an air outlet and first and second desiccant-containing towers for processing air delivered therethrough. Each tower has an exhaust valve arrangement. The method includes the steps of providing a purge isolation valve and a heater in communication with the air inlet, the air outlet and first and second desiccant-containing towers, the heater being controllably energized and de-energized; introducing compressed moisture laden air from the air inlet into one of the towers such that the desiccant therein is regenerated when the air flows therethrough, the air exiting the one tower being delivered to an aftercooler, separator and drain system where the air is cooled and partially dried and transferred to the other tower to be dried as the air passes through the other tower with the dried air flowing to the air outlet; selectively stopping the flow of air from the air inlet to the one tower and delivering the air from the air inlet directly to the aftercooler, separator and drain system for passage to the other tower and the air outlet; selectively energizing the heater; controllably diverting a portion of the cooled dry air passing to the air outlet through the isolation valve and the energized heater such the heated dry air is delivered to the one tower having its desiccant regenerated, the heated dried air passing through the one tower and being purged to the atmosphere by briefly pulsing the exhaust valve arrangement for the one tower following a predetermined interval in which the exhaust valve is momentarily closed to build up and hold pressure in the heater and the one tower. When the predetermined pressure is reached, the isolation valve is closed to hold the pressure in the heater shell and the other off the tower; and selectively de-energizing the heater and bypassing the portion of cooled dried air along a separate pathway connected to the one tower such that cooled dried air is delivered to the one tower, the cooled dry air passing through the one tower and being purged to atmosphere by opening the exhaust valve arrangement.

Various other objects, features and advantages of the invention will be made apparent in the following description taken together with the drawings.

BRIEF DESCRIPTION OF THE DRAWINGS

The drawings illustrate the best mode presently contemplated of carrying out the invention.

In the drawings.

DETAILED DESCRIPTION OF THE INVENTION

Figure 1:
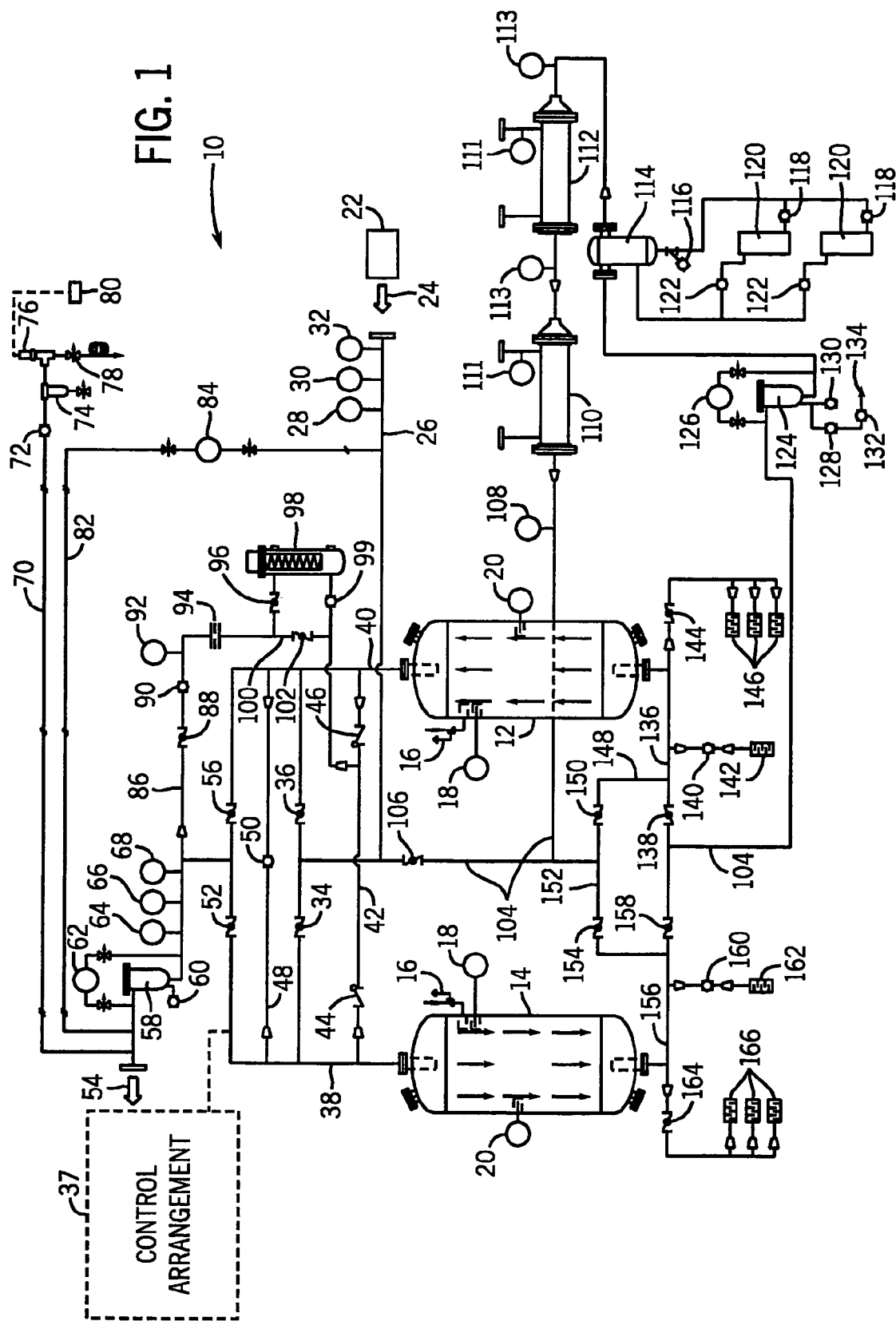
FIG. 1 is a schematic view of the heat of compression gas drying apparatus embodying the present invention.

Referring now to FIG. 1, the heat of compression gas drying apparatus 10 embodying the present invention includes a pair of towers 12 and 14. These towers contain a desiccant such as activated alumina. The twin tower system allows one of the towers to be used for drying, while the other tower is having its desiccant regenerated. Each tower 12, 14 is provided with a pressure relief valve 16, a pressure gauge 18 and a temperature gauge 20.

A compressor 22 which may be a multi-stage compressor is connected to a source of air, and has an output of hot moisture laden, superheated air which is delivered to an air inlet 24 for the drying apparatus 10. A conduit 26 is provided with a temperature indicator 28, a pressure indicator 30 and a temperature transmitter 32 and connects the air inlet 24 with air inlet valves 34 and 36.

The opening and closing of valves 34 and 36 as well as the opening and closing of other valves and components in the system is controlled by a control arrangement 37 which by mechanical and/or electrical/electromechanical/computer operation responds to various pressures, temperatures and dew point readings, and causes solenoids and actuators to time and actuate the various valves.

Conduit 38 connects the air inlet valve 34 with the top of the tower 14 while conduit 40 joins the air inlet valve 36 with the top of the other tower 12. Conduit 42 interconnects conduits 38 and 40 and purge flow check valves 44 and 46. Conduit 48 further interconnects conduits 38 and 40 and is provided with a re-pressurizing valve 50.

Conduit 38 is connected to air outlet valve 52 and the air outlet 54 for the drying apparatus 10. Conduit 40 is connected to an outlet valve 56 and the air outlet 54 which is connected to an afterfilter 58 and a drain valve 60 monitored by a differential pressure indicator 62. Air delivered to the outlet 54 also is monitored by a temperature transmitter 64, a temperature indicator 66 and a pressure indicator 68. Conduit 70 is connected to the air outlet 54 as well as an isolation valve 72, a pilot air filter 74, a humidity sensor 76, a bleed valve 78 and a digital dew point monitor 80. Conduit 82 joins air outlet 54 with conduit 26 and is provided with a differential pressure indicator 84. Conduit 86 includes a purge isolation valve 88, a purge adjusting valve 90, a pressure indicator 92, a purge orifice assembly 94, a heater isolation valve 96, and a heater 98 and may further include a pulse purge regeneration valve 99. Conduit 100 is in communication with conduit 86 and is connected to a heater bypass valve 102.

Conduit 104 is connected to conduit 26 and to a pressure vessel bypass valve 106, a temperature indicator 108, a tower water aftercooler 110, a chilled water aftercooler 112, a separator 114, a manual drain valve 116, a pair of drain isolation valves 118, a pair of drain outlets 120, a pair of drain vent isolation valves 122, a pre-filter automatic drain 124 with a differential pressure indicator 126, a drain isolation valve 128 an auxiliary drain valve 130 and a pre-filter automatic drain 132 in communication with a drain outlet 134. The aftercoolers 110 and 112 have temperature transmitters 111 and temperature indicators 113.

Conduit 136 is connected between conduit 104 and the bottom of tower 12 and is further connected to an aftercooler outlet valve 138, a depressurizing valve 140 having a muffler 142 and a purge outlet valve 144 having mufflers 146. Conduit 148 connects conduits 104 and 136 and an aftercooler inlet valve 150. Conduit 152 is connected to an aftercooler inlet valve 154 and a conduit 156 which connects the bottom of tower 14 with conduit 104. The conduit 156 is provided with an aftercooler outlet valve 158, a depressurizing valve 160 with muffler 162 and a purge outlet valve 164 having mufflers 166. The mufflers 142, 146, 162, 166 exhaust air to the atmosphere.

In describing operation of the gas drying apparatus 10, it will be assumed that tower 12 is in a drying phase and that tower 14 is in a regeneration phase. A typical cycle for two consecutive drying and regenerating phases is eight hours. At the four hour mark, the process reverses i.e., tower 12 which was in the drying phase and now goes into a regeneration phase, and tower 14 which was in a regeneration phase now enters a drying phase. In operation with tower 12 in a drying phase, the other tower 14 is readied for desiccant regeneration in a heat of compression (PHC) mode by receiving the hot moisture laden superheated air from the compressor discharge. The control arrangement 37 is utilized to close valves 52, 140, 144, 158, 160 and 164 and open valves 34 and 154. Valves 36, 50 and 150 are closed. Bypass valve 106 is closed so that hot compressed moisture laden air from inlet 24 passes through conduit 26, valve 34 and conduit 38 into the top of tower 14. The hot moisture laden superheated air passes through the desiccant bed in tower 14 to release the moisture absorbed during the previous cycle. The moisture is carried by the hot air out of the bottom of tower 14 through conduit 156, valve 154 and conduits 152 and 104 to the first aftercooler 110. The hot air flowing through aftercooler 110 is partially cooled and condensed, and flows through the second aftercooler 112 where the moisture in the air is condensed by chilled water. Next, the air passes through the separator 114 where remaining moisture is released and drained using components 116-134. The cooled mostly dried air now flows through conduit 104, opened valve 138 and conduit 136 into the bottom of tower 12. The desiccant bed in tower 12 adsorbs any moisture as the air passes upwardly through tower 12. Compressed dry air exiting tower 12 passes through conduit 40, opened isolation valve 56 and afterfilter 58 to air outlet 54.

After a predetermined time in the PHC mode, if the temperature of the desiccant bed in tower 14 has not reached a predetermined temperature as sensed by thermostat 20, regeneration of desiccant of bed in tower 14 from incoming air is stopped by closing valves 34 and 154. All incoming air is bypassed from inlet 24 to the aftercoolers 110, 112 via conduit 104 and bypass valve 106 which is opened. Tower 14 is depressurized by opening valve 160. Purge outlet valve 164 is also opened to commence a purge heating and cooling (PPR) mode. When a pressure switch associated with pressure indicator 18 on tower 14 closes indicating depressurization is complete, the external heater 98 is energized. At the same time, the purge isolation valve 88 is opened so that about 3-7% of the dry air flowing to the air outlet 54 will be directed through conduit 86 depending on the setting of purge adjusting valve 90. Purged dry air flows through flow orifice 94, open heater isolation valve 96, heater 98, open regeneration valve 99 (if included) and check valve 44 and into tower 14 to further heat and dry the desiccant bed therein. Periodically, exhaust valves 160 and 164 are closed for a set time interval, during which the line pressure in conduit 86, heater 98 and tower 14 builds up to the predetermined pressure. When the predetermined pressure is reached, the isolation valve is closed to hold the pressure in the heater shell and the other off the tower. At the end of the set time interval, the valves 160 and 164 are briefly pulsed open so that hot air passing from the bottom of tower 14 is exhausted to atmosphere through valves 160 and 164 and mufflers 162 and 166, respectively. Purge isolation valve 88 again opens for a predetermined time.

The normal duration of the pulse purge external heating mode is normally about 1 hour. During this interval, the temperature of the desiccant bed in tower 14 is monitored by thermostat 20. Upon reading the desired preset temperature, the heater 98 is de-energized and locked out, heater isolation valve 96 and regeneration valve 99 are closed, and heater bypass valve 102 is opened to commence a cooling cycle. Cooling dried air exiting tower 14 continues to be exhausted to atmosphere during the cooling cycle. Near the end of the four hour period, the valves 160 and 164 are closed and repressurizing valve 50 is opened and then closed to deliver dry air from tower 12 through conduits 38, 40 and 48 to pressurize tower 14.

If the dew point at the air outlet 54 is better than the desired dew point as sensed by dew point monitor 80, the operation will stop and the sequence will be monitored by dew point demand. The drying cycle will continue as long as the dew point remains better than the desired set point. If the dew point is worse than the preset level, the apparatus 10 continues to operate through the normal sequence.

After a four hour interval, the functions of the towers 12 and 14 switch. Valves 52 and 158 are opened to start the drying cycle through regenerated tower 14. At the same time, valves 56, 138, 140 and 144 are closed on tower 12 valves 160, 164 are closed on tower 14, and purge exhaust valve 88 is also closed. Valves 44, 50 and 154 are closed. Air inlet valve 36 and aftercooler inlet valve 150 are opened on tower 12 to start the regeneration cycle. The hot air from compressor 22 flows into air inlet 24 and through conduit 26, valve 36 in conduit 27 and conduit 40 into the top of regenerating tower 12. Air flow exiting regenerating tower 12 passes through conduits 136 and 148, valve 150 and conduit 104 for delivery to the aftercoolers 110, 112 and components 114-134. Air continues to flow along conduit 104 through valve 158 and conduit 156 and into the bottom of drying tower 14. Dry air passes out of tower 14, through conduit 38 and valve 52 to the air outlet 54.

After a predetermined time in the PHC mode, if the temperature of the desiccant bed in tower 12 has not reached a predetermined temperature as sensed by thermostat 18, regeneration of desiccant of bed in tower 12 from incoming air is stopped by closing valves 36 and 150. All incoming air is bypassed from inlet 24 to the aftercoolers 110, 112 via conduit 104 and bypass valve 106 which is opened. Tower 12 is depressurized by opening valve 140. Purge outlet valve 144 is also opened to commence a purge heating and cooling (PPR) mode. When a pressure switch associated with pressure indicator 18 on tower 12 closes indicating depressurization is complete, the external heater 98 is energized. At the same time, the purge isolation valve 88 is opened so that about 3-7% of the dry air flowing to the air outlet 54 will be directed through conduit 86 depending on the setting of purge adjusting valve 90. Purged dry air flows through flow orifice 94, open heater isolation valve 96, heater 98, open regeneration valve 99 (if included) and check valve 46 and into tower 12 to further heat and dry the desiccant bed therein. Periodically, exhaust valves 140 and 144 are closed for a set time interval, during which the line pressure in conduit 86, heater 98 and tower 12 builds up to the predetermined pressure, when the predetermined pressure is reached, the isolation valve is closed to hold the pressure in the heater shell and the other off the tower. At the end of the set time interval, the valves 140 and 144 are briefly pulsed open so that hot air passing from the bottom of tower 12 is exhausted to atmosphere through valves 140 and 144 and mufflers 142 and 146, respectively. Purge isolation valve 88 again opens for a predetermined time.

The normal duration of the pulse purge external heating mode is normally about 1 hour. During this interval, the temperature of the desiccant bed in tower 14 is monitored by thermostat 20. Upon reading the desired preset temperature, the heater 98 is de-energized and locked out, heater isolation valve 96 and regeneration valve 99 are closed, and heater bypass valve 102 is opened to commence a cooling cycle. Cooling air exiting tower 12 continues to be exhausted to atmosphere during the cooling cycle. Near the end of the four hour period, the valves 140 and 144 are closed and repressurizing valve 50 is opened and then closed to deliver dry air from tower 14 through conduits 38, 40 and 48 to pressurize tower 12.

If the dew point at the air outlet 54 is better than the desired dew point as sensed by dew point monitor 80, the operation will stop and the sequence will be monitored by dew point demand. The drying cycle will continue as long as the dew point remains better than the desired set point. If the dew point is worse than the preset level, the apparatus 10 continues to operate through the normal sequence.

In the normal sequence just before the end of the four hour interval, the purge exhaust valve 88 is closed. Once the entire 8 hour cycle has finished, the towers 12, 14 again switch and the entire process repeats.

The invention further contemplates use where it is desirable during the external heating mode to pulse the purge regeneration valve 99 downstream of heater 98 on/off to transmit spurts of pressurized heated dry air to the applicable tower 12, 14. In such use, the purge isolation valve 88 is open during the entire external heating mode as are the appropriate exhaust valves 160, 164 or 140, 144 on the towers 12, 14.

While the invention has been described with reference to a preferred embodiment, those skilled in the art will appreciate that certain substitutions, alterations and omissions may be made without department from the spirit thereof. Accordingly, the foregoing description is meant to be exemplary only and should not be deemed limitative on the scope of the invention set forth with the following claims.

We claim:

1. A heat of compression gas drying apparatus having a dryer inlet for receiving compressed moisture laden air, and a dryer outlet for delivering compressed dry air, the apparatus comprising:
    a first desiccant-containing tower having a first exhaust valve arrangement;
    a second desiccant-containing tower having a second exhaust valve arrangement;
    an aftercooler, separator and drain system;
    conduit structure for interconnecting the first and second towers with the aftercooler, separator and drain system, and enabling passage of the moisture laden air from the dryer inlet to be processed by the first and second towers and the aftercooler, separator and drain system for delivering cooled dry air to the dryer outlet;
    a control arrangement connected to the conduit structure for controlling the flow of air through the first and second towers and the aftercooler, separator and drain system, the control arrangement including a purge isolation valve; and
    a heater interconnected to the first and second towers by the conduit structure and selectively energized by the control arrangement to receive a portion of dry air from one of the towers in response to periodic actuation of the exhaust valve arrangement so as to periodically deliver heated dried air to the other of the towers with its exhaust valve arrangement closed, the control arrangement allowing de-energization of the heater and bypassing of the cooled dry air outside the de-energized heater through the conduit structure for periodically delivering cooled dried air to the other of the towers, whereby closing of the exhaust valve arrangement permits building of a predetermined pressure on the conduit structure, the heater and the other of the towers and momentary holding of the pressure in the other of the towers, for a predetermined interval after which the exhaust valve arrangement of the other of the towers is pulsed open to purge the dried air in the other of the towers to atmosphere.

2. The improvement of claim 1, including a pulse purge regeneration valve positioned immediately downstream of the heater in the conduit structure, the regeneration valve being pulsed on/off upon activation of the purge isolation valve.

3. A method for drying gas in an apparatus having an air inlet fed by a source of compressed moisture laden air, an air outlet and first and second desiccant-containing towers for processing air delivered therethrough each of the towers having an exhaust valve arrangement, the method comprising the steps of:

providing a purge isolation valve and a heater in communication with the air inlet, the air outlet and first and second desiccant-containing towers, the heater being controllably energized and de-energized;

introducing compressed moisture laden air from the air inlet into one of the towers such that the desiccant therein is regenerated when the air flows therethrough, the air exiting the one tower being delivered to an aftercooler, separator and drain system where the air is cooled and dried and transferred to the other tower to be dried as the air passes through the other tower with dried air flowing to the air outlet;

selectively stopping the flow of air from the air inlet to the one tower and delivering the air from the air inlet directly to the aftercooler, separator and drain system for passage to the other tower and the air outlet;

selectively energizing the heater;

controllably diverting a portion of the cooled dried air passing to the air inlet through the purge isolation valve and the energized heater such that heated dried air is transferred to the one tower having its desiccant regenerated, the heated dried air passing through the one tower and being purged to the atmosphere by briefly pulsing the exhaust valve arrangement for the one tower following a predetermined interval in which the purge isolation valve is momentarily closed to build up and hold pressure in the heater and the one tower; and selectively de-energizing the heater and bypassing the portion of cooled dried air along a separate pathway connected to the one tower such that the cooled dried air is transferred to the one tower, the cooled dried air passing through the one tower and being purged to atmosphere by briefly pulsing the exhaust valve arrangement for the one tower following a predetermined interval in which the exhaust valve arrangement is momentarily closed to build up and hold pressure in the heater and the one tower.

4. The method of claim 3, wherein the portion of cooled dried air diverted to the isolation valve is about 3-7% of the total to cooled dried air delivered to the air outlet.

5. The method of claim 3, wherein the heated dried air inside the one tower is brought to a predetermined temperature.

6. The method of claim 3, including the step of providing a pulse purge regeneration valve downstream of the heater.

7. The method of claim 6, including the step of pulsing the regeneration valve on/off upon activation of the exhaust valve arrangement.

* * * * *